United States Patent [19]
Ohtani

[11] Patent Number: 5,341,377
[45] Date of Patent: Aug. 23, 1994

[54] ISDN TERMINAL, ISDN TERMINAL COMMUNICATION SYSTEM, AND METHOD FOR CONTROLLING ISDN TERMINALS

[75] Inventor: Masahito Ohtani, Atsugi, Japan
[73] Assignee: Ricoh Company, Ltd., Tokyo, Japan
[21] Appl. No.: 694,914
[22] Filed: May 2, 1991
[30] Foreign Application Priority Data May 11, 1990 [JP] Japan .................................. 2-119738

[51] Int. Cl.⁵ .............................................. H04J 3/12
[52] U.S. Cl. .................................. 370/110.1; 358/434
[58] Field of Search ...................... 370/110.1, 94.1, 99, 370/84, 61, 94.2, 60, 60.1, 68.1; 375/5; 379/93, 100, 116, 94; 358/434, 435, 436, 438, 439, 440, 442, 443, 444

[56] References Cited

U.S. PATENT DOCUMENTS

| | | | |
|---|---|---|---|
| 4,736,364 | 4/1988 | Basso et al. | 370/68.1 |
| 4,935,923 | 6/1990 | Shimizu et al. | 370/60 |
| 4,965,795 | 10/1990 | Coffelt et al. | 370/110.1 |
| 4,998,248 | 3/1991 | Matsuzaki | 370/110.1 |
| 4,999,836 | 3/1991 | Fujiwara | 370/110.1 |
| 5,003,583 | 3/1991 | Iggulden et al. | 379/93 |
| 5,012,470 | 4/1991 | Shobu et al. | 370/61 |
| 5,025,497 | 6/1991 | Yoshiura | 370/94.2 |
| 5,046,189 | 9/1991 | Kainuma | 379/93 |
| 5,048,078 | 9/1991 | Satomi et al. | 379/93 |

Primary Examiner—Douglas W. Olms
Assistant Examiner—Shick Hom
Attorney, Agent, or Firm—Oblon, Spivak, McClelland, Maier & Neustadt

[57] ABSTRACT

A first ISDN terminal transmits a receipt result information report to a second ISDN terminal via a D-channel after the first ISDN terminal receives a data from the second ISDN terminal. The data comprises image information. The image information is transmitted via a B-channel. The receipt result information report indicates a result of receiving of the image information for confirmation by the second ISDN terminal of the receiving at the first ISDN terminal. The D-channel is used for transmitting predetermined protocol information between the ISDN terminals. The predetermined protocol information includes an identification information. The identification information is used for controlling a connection between the ISDN terminals.

15 Claims, 7 Drawing Sheets

| PROTOCOL DISCRIMINATOR |
|---|
| CALL REFERENCE |
| MESSAGE TYPE |
| MANDATORY INFORMATION ELEMENT |
| INFORMATION ELEMENT |

FIG.3B

| BEARER CAPABILITY |
|---|
| CHANNEL IDENTIFICATION |
| CALLING PARTY NUMBER |
| CALLING PARTY SUBADDRESS |
| CALLED PARTY NUMBER |
| CALLED PARTY SUBADDRESS |
| LOW LAYER COMPATIBILITY |
| HIGH LAYER COMPATIBILITY |
| USER-USER |

FIG.3C

| MORE DATA |
|---|
| USER-USER |

```
                    HDR              CNT
              ┌───────────┐    ┌──────────┐
RECEIPT RESULT
INFORMATION   TX          RX
              0123-00     0223-XX
              A4 3 SHEETS 300DPI
                       LINE ERROR-0

RECEIPT TIME
AM 10:03

LTD. △△
       ○× SECTION
       MR.○○○○

THANK YOU FOR ~
```

ISDN TERMINAL, ISDN TERMINAL COMMUNICATION SYSTEM, AND METHOD FOR CONTROLLING ISDN TERMINALS

BACKGROUND OF THE INVENTION

The present invention relates generally to an integrated services digital network (abbreviated ISDN for short) terminal, an ISDN terminal communication system, and a method for controlling ISDN terminals. The present invention can be effectively applied to a facsimile apparatus used for the ISDN.

With the recent advances in ISDN construction, facsimile apparatuses used for the ISDN have been accordingly developed. The ISDN is supposed to replace the public services telephone network (called PSTN for short), however, until this actually happens, it is necessary to reconcile the use of the ISDN with that of the PSTN, and thus information must be transmitted between a terminal of the ISDN and that of the PSTN. Hereupon, a facsimile apparatus has been developed to serve as a group 4 facsimile apparatus, which is mainly used for the ISDN, and a group 3 facsimile apparatus, which is mainly used for the PSTN. These facsimile apparatuses use multichannel basic interfaces for the ISDN, such as two data channels (called B-channels hereinafter) and a one signal channel (called D-channel hereinafter). The B-channels are mainly used for data transmission, and the D-channel is mainly used for call control. Therefore, a data transmission through one of the B-channels can take place almost simultaneously with the acceptance of a call through the D-channel. And the B-channels are usually controlled by a single transmission controller so that the data transmission through one B-channel cannot take place simultaneously with data transmission from the other B-channel. Additionally, a facsimile apparatus ignores or rejects an incoming call based on an outgoing call from a terminal while it is communicating with another terminal since one of the B-channels is being used. Consequently, the terminal transmits the same outgoing call to the facsimile apparatus after the communication is finished. Therefore, the outgoing call must be unnecessarily repeated. On the other hand, a facsimile apparatus which can control both B-channels simultaneously is expensive.

Hereupon, a receiver generally transmits a receipt result to a transmitter via one of the B-channels after the receiver has received a predetermined data from the transmitter. Therefore, if the transmitter is communicating with another facsimile apparatus, the receiver cannot effectively transmit the receipt result. In particular, a general facsimile apparatus is limited as regards repeated outgoing call times so that the receiver sometimes fails to communicate with the transmitter in a case where the transmitter is communicating for a long period of time.

SUMMARY OF THE INVENTION

Accordingly, it is a general object of the present invention to provide a novel and useful ISDN terminal, ISDN terminal communication system, and method for controlling ISDN terminals in which the above disadvantages are eliminated.

Another object of the present invention is to provide an inexpensive ISDN terminal, ISDN terminal communication system, and method for controlling ISDN terminals in which the receipt result is successfully transmitted.

According to one aspect of the present invention, an integrated services digital network (ISDN) terminal connected to a data channel (B-channel) and a signal channel (D-channel) comprises first control means for controlling the connection between the ISDN terminal and another ISDN terminal by means of predetermined protocol information transmitted through the D-channel, the predetermined protocol information including identification information of the ISDN terminal and the other ISDN terminal, second control means for controlling the transmitting of a data via the B-channel, memory means for storing at least the identification information of the other ISDN terminal, and third control means, coupled to the memory means, for producing a receipt result information report after the ISDN terminal receives the data, the receipt result information report indicating a result of the receiving of the data, and for controlling the first control means so that the first control means can transmit the receipt result information report to the other ISDN terminal via the D-channel.

According to another aspect of the present invention, an integrated services digital network (ISDN) terminal communication system comprises a transmission line comprising a data channel (B-channel) and a signal channel (D-channel), and at least two ISDN terminals, operatively interconnected to the transmission line, each ISDN terminal comprising first control means for controlling the connection between the ISDN terminal and another ISDN terminal by means of predetermined protocol information transmitted through the D-channel, the predetermined protocol information including identification information of the ISDN terminal and the other ISDN terminal, second control means for controlling the transmitting of a data via the B-channel, memory means for storing at least the identification information of the other ISDN terminal, and third control means, coupled to the memory means, for producing a receipt result information report after the ISDN terminal receives the data, the receipt result information report indicating a result of the receiving of the data, and for controlling the first control means so that the first control means can transmit the receipt result information report to the other ISDN terminal via the D-channel, and thus each ISDN terminal being able to recognize the receipt result information report transmitted through the D-channel.

According to still another aspect of the present invention, a method for controlling integrated services digital network (ISDN) terminals, each ISDN terminal being connected to a data channel (B-channel) and a signal channel (D-channel), each ISDN terminal comprising first control means for controlling the connection between the ISDN terminal and another ISDN terminal by means of predetermined protocol information transmitted through the D-channel, the predetermined protocol information including identification information of the ISDN terminal and the other ISDN terminal, second control means for controlling the transmitting of a data via the B-channel, memory means, and third control means, coupled to the memory means, for producing a receipt result information report indicating a result of the receiving of the data, and for controlling the first control means, the method comprises the steps of instructing the memory means to store at least the identification information in the memory when the protocol information is transmitted to a first ISDN terminal to which the data is transmitted from a second ISDN terminal, instructing the third control means of the first ISDN terminal to produce the receipt result information report after the data is transmitted to the first ISDN terminal, and instructing the third control means to control the first control means so that the receipt result information report can be transmitted from the first ISDN terminal to the second ISDN terminal via the D-channel.

According to the present invention, since the receipt result information report is transmitted via the D-channel, it definitely can be transmitted by one transmission procedure.

Other objects and further features of the present invention will become apparent from the following detailed description when read in conjunction with the accompanying drawings.

DESCRIPTION OF THE PREFERRED EMBODIMENTS

Figure 1:
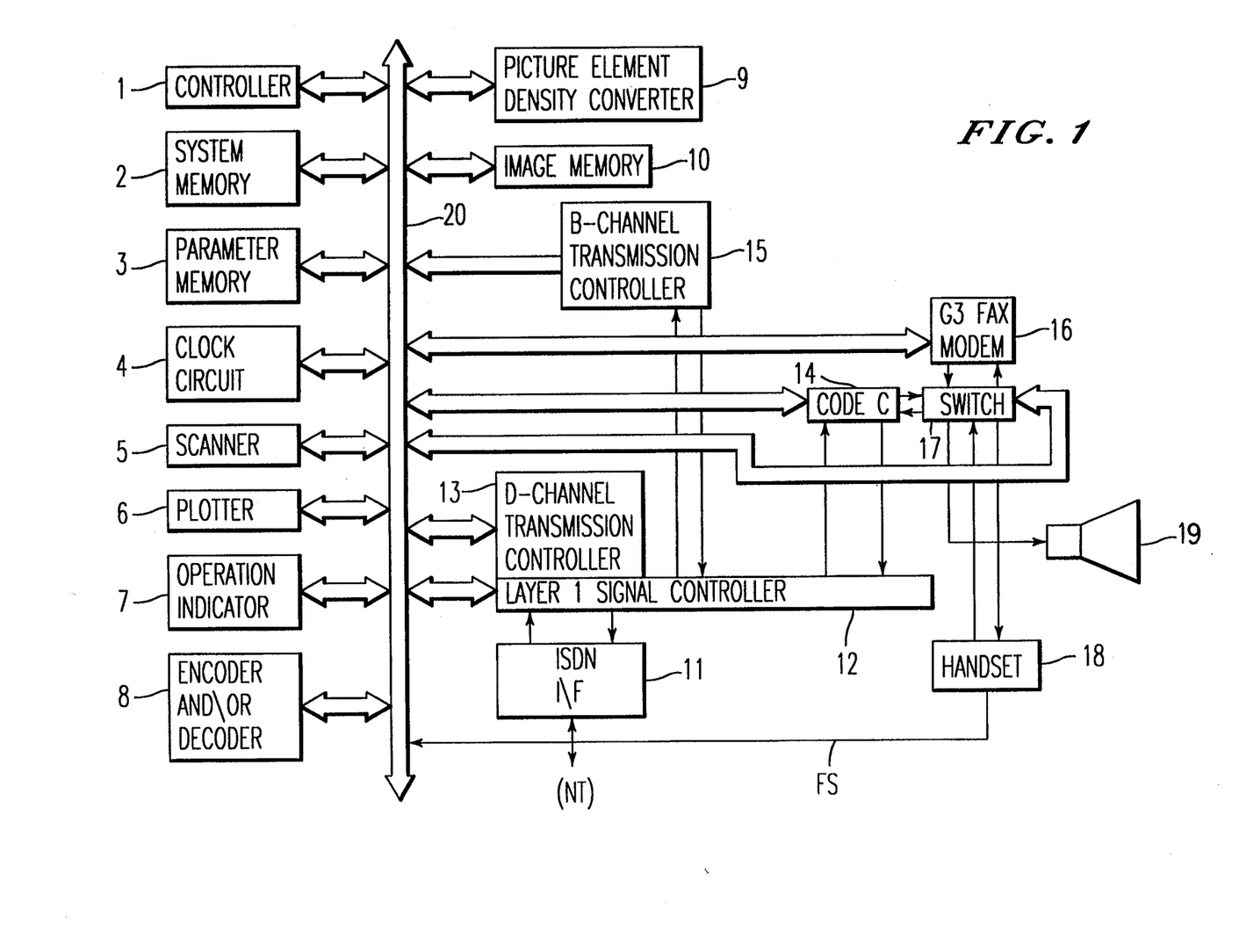
FIG. 1 shows a system block diagram of a facsimile apparatus according to the present invention.

A facsimile apparatus (called FAX for short) shown in FIG. 1 serves as a group 4 facsimile apparatus (called G4 FAX for short), a group 3 facsimile apparatus (called G3 FAX for short), and a telephone. The FAX is used for the ISDN. However, the FAX has a single transmission controller so that data transmission concerning the G3 FAX cannot take place simultaneously with that concerning the G4 FAX. Incidentally, various messages of a circuit mode are defined in accordance with TTC (Telecommunication Technology Committee).

A controller 1 controls the general operation of each part of the FAX, transmission procedures of the G3 FAX and the G4 FAX, and a telephone procedure. A system memory 2 stores some programs used for the above procedures and various information required for executing the above programs therein. The system memory 2 functions as a working area of the controller 1. A parameter memory 3, comprising a static random access memory (called SRAM for short), stores various items of information which identify the FAX. A clock circuit 4 gives the present time. A scanner 5 scans, with a predetermined resolution, a predetermined image. A plotter 6 outputs the predetermined image with a resolution established by the G4 FAX. An operation indicator 7, comprising various operation keys and indicators, indicates the operation of the FAX. An encoder and/or decoder 8 encodes image signals into a compressed image data and/or decodes the compressed image data into the image signals. A picture element (called pixel for short) density converter 9 converts the pixel density to make the pixel density of images of this FAX equal to these of a communicate terminal.

An image memory 10 stores various information, such as an image signal and data to be transmitted. An ISDN interface circuit 11 connects the FAX to the ISDN. A layer 1 signal controller 12 functions as a signal processor of the layer 1, and combines and/or separates signals from a D-channel and B-channel. A D-channel transmission controller 13 performs outgoing and/or incoming call control procedures. Additionally, the D-channel transmission controller 13 transmits the presence of a call establishment to the controller 1. A CODEC 14 functions as an A/D converter. A B-channel transmission controller 15 executes transmission control procedures of layers 2, 3, 4, and 5. If the D-channel transmission controller 13 transmits the presence of the call establishment to the controller 1, the controller 1 instructs the B-channel transmission controller 15 to execute one of the transmission control procedures.

A G3 FAX modem 16 has a low speed modem function (V.21 modem) used for transmission procedure signals and a high speed modem function (V.29 modem, V.27 modem) mainly used for image data. The switch 17 connects the CODEC 14 to the G3 FAX modem 16, a handset 18 used for a call, and a speaker 19 outputting a calling tone (called CNG for short) IS. The controller 1, system memory 2, parameter memory 3, clock circuit 4, scanner 5, plotter 6, operation indicator 7, encoder and/or decoder 8, pixel converter 9, image memory 10, layer 1 signal controller 12, D-channel transmission controller 13, CODEC 14, B-channel transmission controller 15, G3 FAX modem 16 and switch 17 are coupled to the inside bus 20, respectively, so as to be connected with one another. Incidentally, hook signal FS indicating a hook state of the handset 18 is transmitted to the controller 1 via the inside bus 20.

Figure 2A:
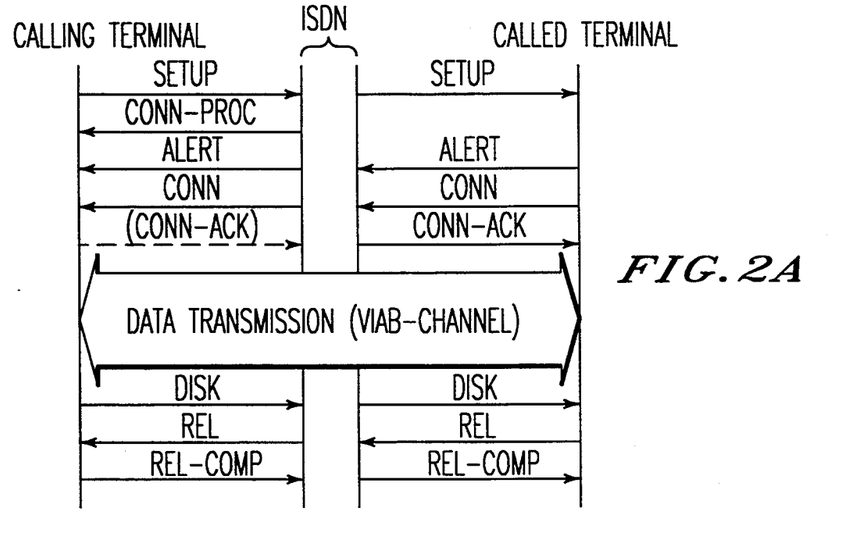
FIG. 2A shows a time chart for explaining a general circuit-switched connection control procedure using a data channel in the ISDN.
Figure 2B:
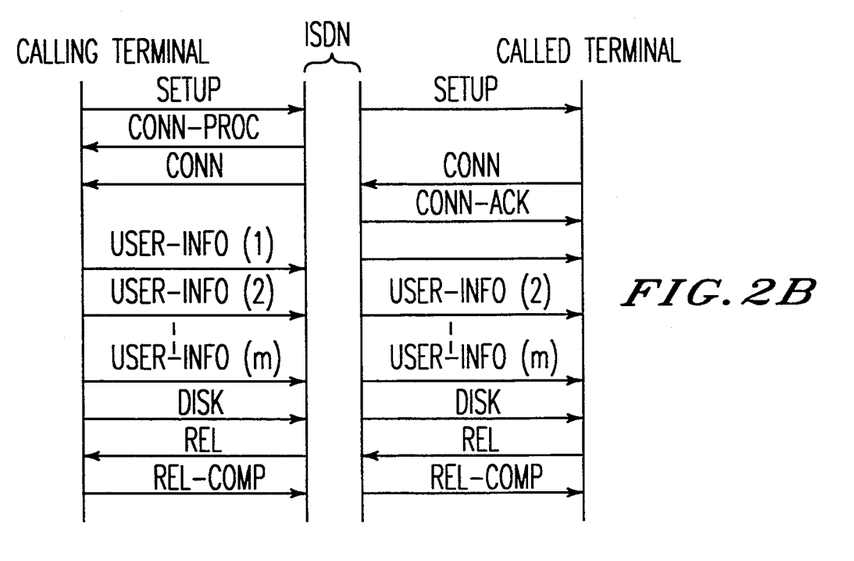
FIG. 2B shows a time chart for explaining a general circuit-switched connection control procedure using a signal channel in the ISDN.

FIG. 2A shows a time chart for explaining a general circuit-switched connection control procedure using the B-channel in the ISDN. At first a calling terminal establishes a line switching mode concerning a transmission mode. Subsequently, the terminal transmits a setup message (called SETUP for short) to the ISDN which designates a predetermined called terminal. The SETUP indicates the requirement of the setup with the called terminal. In response, the ISDN transmits the SETUP to the predetermined called terminal so as to transmit an outgoing call. The ISDN transmits a call proceeding message (called CALL PROC for short), which indicates the setup proceeding, to the calling terminal. On the other hand, the called terminal generally transmits an alerting message (called ALERT for short) to the ISDN in response to the incoming call. The ISDN transmits the ALERT to the calling terminal so as to inform the FAX about the alert starting of the called terminal. Subsequently, the called terminal transmits a connect message (called CONN for short) to the ISDN, and the ISDN transmits the CONN to the calling terminal so as to inform the FAX about the call proceeding of the called terminal. The ISDN transmits a connect acknowledge message (called CONN ACK for short) to the called terminal so that one of the B-channels used for various data transmissions is established between the calling and called terminals. After a predetermined data transmission, the calling terminal transmits a disconnect message (called DISC for short) to the ISDN, and the ISDN transmits the DISC to the called terminal so as to inform the FAX about the clearing of the B-channels. The called terminal transmits to the ISDN a release message (called REL for short) for clearing the B-channels. In response, the ISDN transmits the REL to the calling terminal. Then the calling terminal transmits a release complete message (called REL COMP for short) to the ISDN, and the ISDN transmits the REL COMP to the called terminal. Consequently, one of the B-channels between the calling and called terminals is released completely.

on the other hand, FIG. 2B shows a time chart for explaining a general circuit-switched connection control procedure using the D-channel in the ISDN. Firstly, the calling terminal establishes the circuit mode using the D-channel. The calling terminal transmits the SETUP to the ISDN to require the call establishment. In response, the ISDN transmits the SETUP which is the outgoing call to the designated called terminal, and transmits a call proceeding message (abbreviated CALL_PROG hereinafter) to the calling terminal so as to inform the calling terminal about the call establishment condition. Then, the called terminal transmits the CONN to the ISDN, and in response, the ISDN transmits the CONN_ACK to the called terminal. After the call establishment is achieved through the D-channel, the calling terminal sequentially transmits a user information message (abbreviated USER_INFO) more than once to the called terminal via the ISDN. When the data transmission is finished, the aforementioned call disestablishment procedure is performed. A packet mode may be used for the data transmission using the D-channel.

Figure 3A:
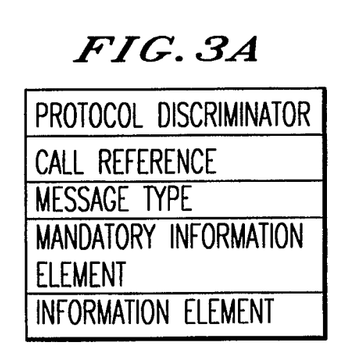
FIG. 3A shows general items and information elements included in a SETUP.

The SETUP comprises, as shown in FIG. 3A, a protocol discriminator, a call reference, a message type, a mandatory information element, and an information element. The protocol discriminator discriminates the protocol recommendations of the layer 3 call control message, such as a format and a sequence. The call reference discriminates which call the message relates to. The message type discriminates the contents of each message. The mandatory information element is always part of each message. The information element is part of each message only when necessary. The number of the mandatory information elements is determined in accordance with the message type, and the number of the information elements is established in accordance with the number of the mandatory information elements.

Figure 3B:
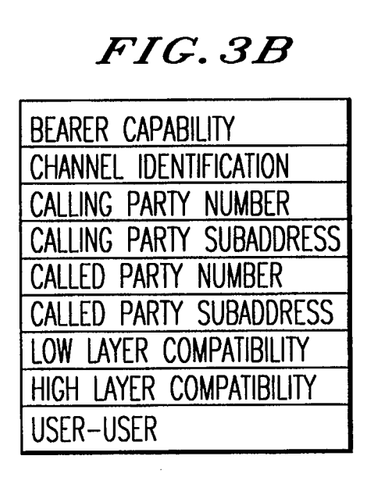
FIG. 3B shows the information element included in the SETUP.

The SETUP also comprises, as shown in FIG. 3B, a bearer capability, a channel identification, a calling party number, a calling party subaddress, a called party number, a called party subaddress, a low layer compatibility, a high layer compatibility, user-user, and the like. The bearer capability is a mandatory information element, and the other elements belong to information elements. The bearer capability comprises an information transfer capability, a transfer mode, and a information transfer rate. The information transfer capability indicates the contents of information to be transmitted, such as speech, unrestricted digital data, restricted digital data, 3.1 kHz audio, 7 kHz audio, and video. The transfer mode indicates whether a circuit switching or a packet switching is being used. The bearer capability further comprises transfer type data and protocol data for users. The channel identification designates a channel to be connected and determines whether or not the channel has been established via the ISDN. The calling party number indicates an ISDN number of the calling terminal, and the called party number indicates that of the called terminal. The calling and called party subaddresses respectively discriminate a desired terminal from among a maximum of eight terminals connectable to one passive bus at the calling party or called party. The low layer compatibility, whose function is basically the same as that of the bearer capability, is mainly used for a communication test between the calling terminal and the called terminal. The high layer compatibility mainly used for the compatibility test between the above terminals represents the type of a terminal, such as a group 2/group 3 FAX, a G4 FAX, a mix mode, a teletex, a videotex, a telex, or a message handling system. The user-user is used for the information transmission among users. The user-user information, without being interpreted by the ISDN, is used for information transmission between users. The user-user includes, like the calling party number, the identification information representing the communicatee terminal.

Figure 3C:
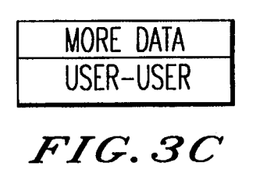
FIG. 3C shows a general view showing a user information message.

Incidentally, the USER_INFO comprises, as shown in FIG. 3C, the aforementioned user-user as mandatory information, and a more data as information. The more data indicates that there is a subsequent data in one data block.

Figure 4:
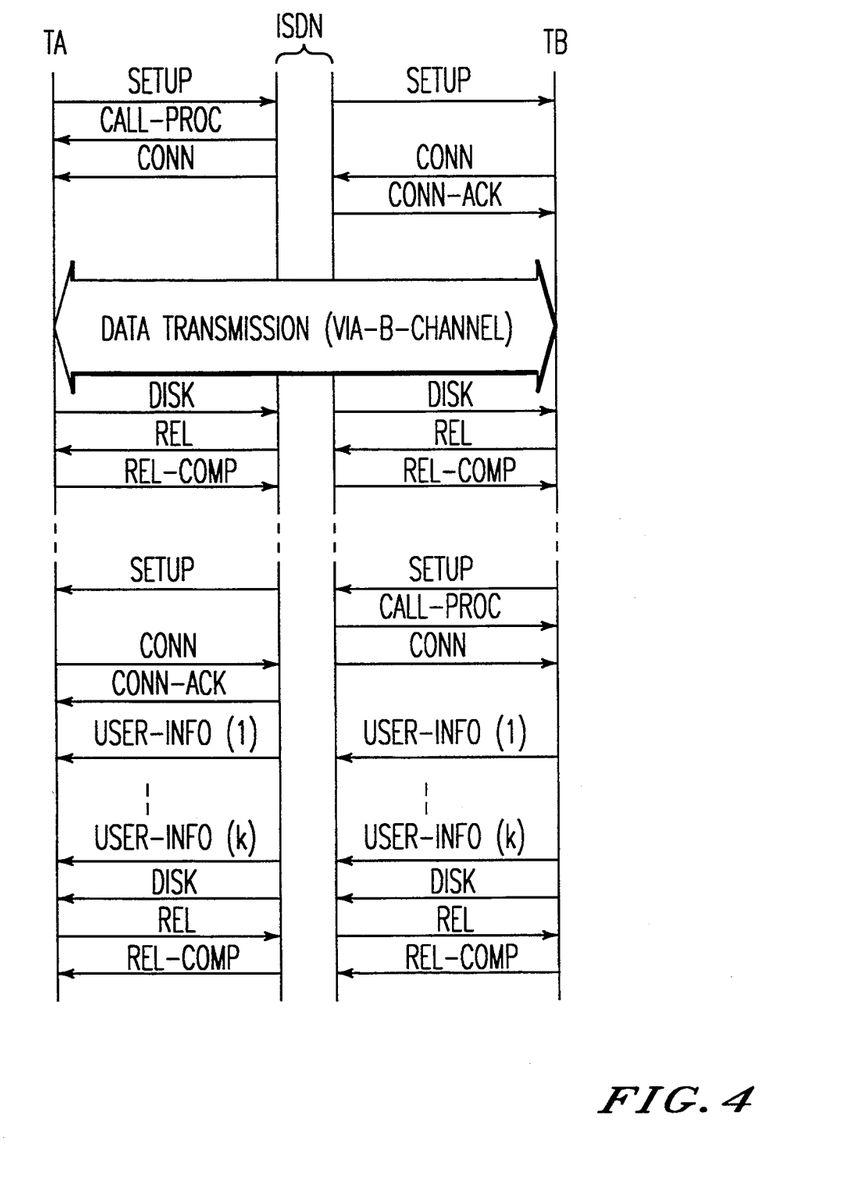
FIG. 4 shows a time chart of the transmission procedure of the facsimile apparatus shown in FIG. 1.
Figure 5:
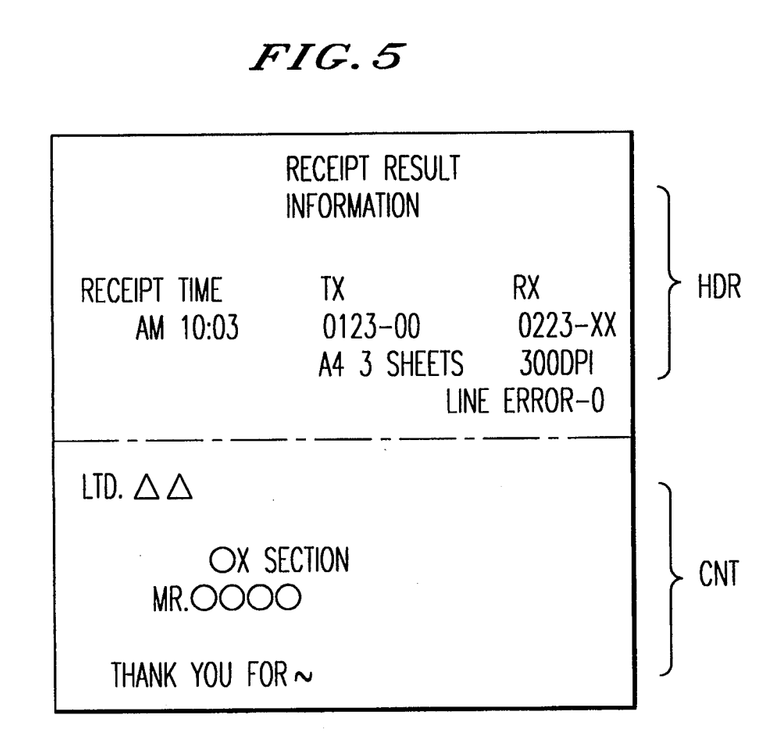
FIG. 5 shows a receipt information report produced by the facsimile apparatus shown in FIG. 1.

A description will now be given of the image data transmission from a terminal TA to a terminal TB and a receipt result information report transmission from TB to TA with reference to FIG. 4. Both terminals TA and TB have the same construction shown in FIG. 1. First, when TA transmits the SETUP which is the outgoing call to TB, consequently, call establishment is achieved between TA and TB via the ISDN. After the image data is transmitted from TA to TB, the disestablishment procedure is performed. Next, TB memorizes the calling party number and the calling party subaddress included in the SETUP transmitted from TA in the parameter memory 3 in FIG. 1, and plots the image corresponding to the image data which TB has received from TA. As shown in FIG. 5, TB edits the receipt result information report comprising the time at which TB plots the image, the calling party number, the calling party subaddress, the called party subaddress, and information on whether or not there is an error when the received image data is decoded. The time information is useful in a case where a predetermined sized paper is not stocked in TB or TB performs the memory receiving. Furthermore, the paper size on which the image is plotted, the number of the papers, the line density value, and the feature of the image may be added to the receipt result information report.

When TB produces the receipt result information report, it transmits the SETUP to the ISDN by designating TA by means of the called party number and the called party subaddress. Thus, the aforementioned call establishment procedure is performed, and the D-channel is established between TA and TB. Then, TB transmits the receipt result information report to TA via the USER_INFO. TA can plot the receipt result information so that the user of TA can confirm the image data transmission from TA to TB. If necessary, the operator of TA can telephone the user of TB. Thus, since the receipt result information report is transmitted via the D-channel, it definitely can be transmitted by one outgoing call of TB.

Figure 6:
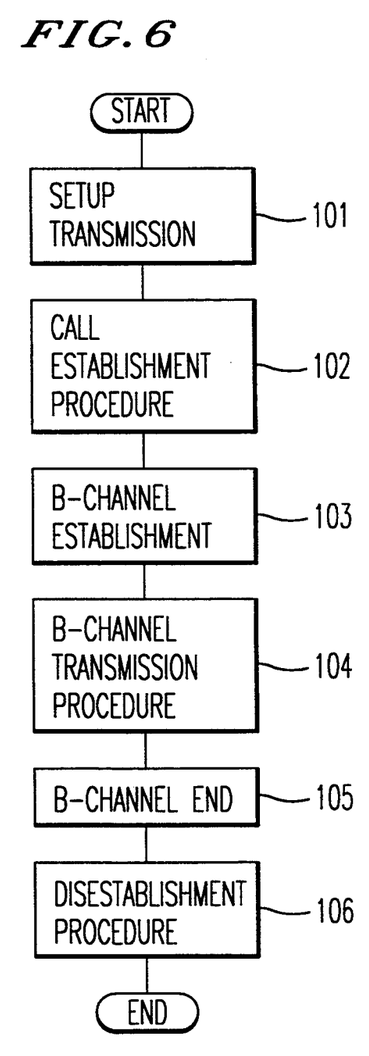
FIG. 6 shows a procedure of the facsimile apparatus shown in FIG. 1 when the image data is transmitted therefrom via a B-channel.

FIG. 6 shows a procedure of the controller 1 in FIG. 1 when the image data is transmitted via the B-channel. First, the SETUP is transmitted (in step 101), and the call establishment procedure is performed (in step 102) to establish the B-channel between this FAX and the communicatee FAX (in step 103). Subsequently, the image data is transmitted via the B-channel (in step 104), then the communication path is released (in step 105), and the disestablishment procedure is performed (in step 106).

Figure 7:
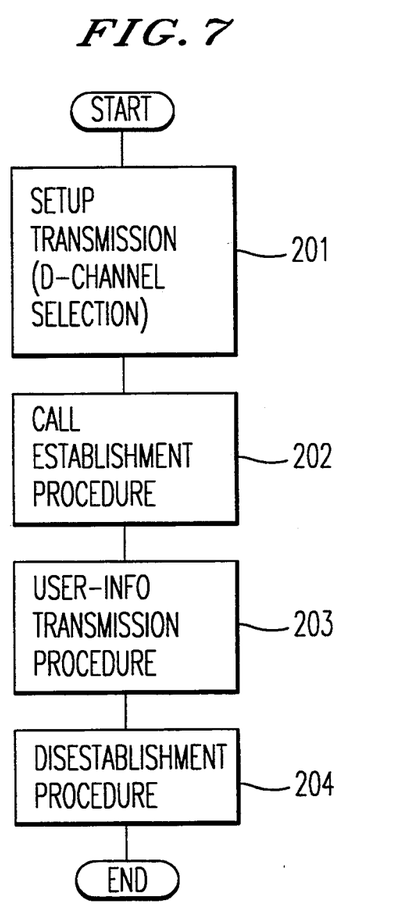
FIG. 7 shows a procedure of the facsimile apparatus shown in FIG. 1 when the receipt report is transmitted therefrom via a D-channel.

FIG. 7 shows a procedure of the controller 1 in FIG. 1 when the receipt result information report is transmitted via the D-channel. First, the SETUP is transmitted and the D-channel is selected as the communication path (in step 201). Then, the call establishment is performed (in step 202) to establish the D-channel as the communication path. Next, the receipt result information is segmented and set in a plurality of USER-INFOs, and then transmitted to the ex-transmitter via the plurality of USER_INFOs (in step 203). Lastly, the disestablishment procedure is performed (in step 204), and the procedure is terminated.

Figure 8:
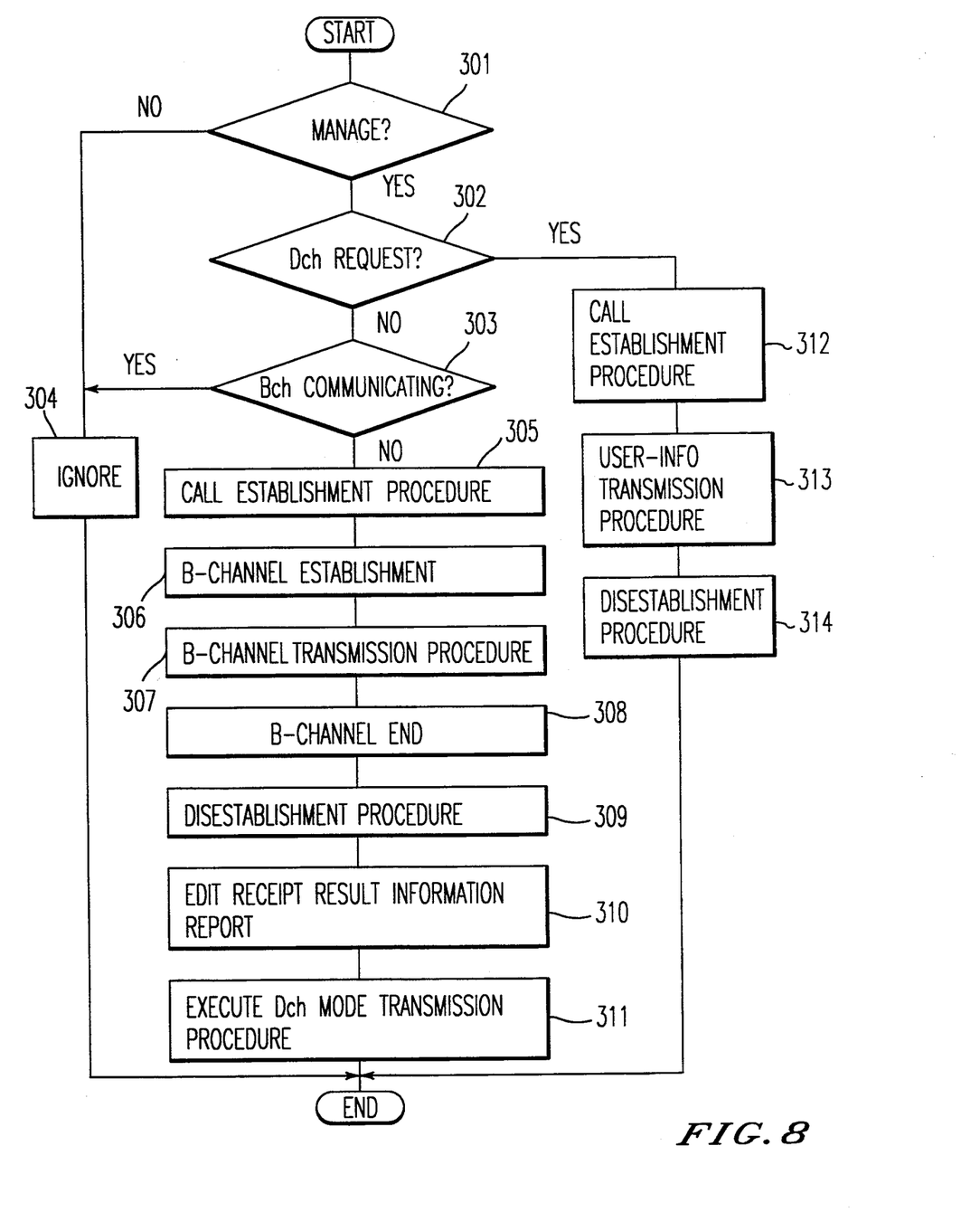
FIG. 8 shows a procedure of the facsimile apparatus shown in FIG. 1 when the data is transmitted thereto.

FIG. 8 shows a procedure of the controller 1 in FIG. 1 when the FAX receives a data. First, the controller 1 checks the contents of the SETUP and judges whether or not the FAX can manage to the call (in step 301). If it is judged that the FAX can manage the call, the controller 1 judges whether or not the D-channel has been selected (in step 302). If the B-channel has been selected, the controller 1 judges whether or not the B-channel is vacant (in step 303). If the FAX cannot manage the call or the B-channel is not vacant, the call is ignored and the procedure is terminated (in step 304). However, if the B-channel is vacant in the step 303, the controller memorizes the called party number and the called party subaddress included in the SETUP, and executes the call establishment procedure (in step 305), and establishes the B-channel as the communication path (in step 306). After the FAX receives the image data (in step 307), the controller 1 releases the communication path (in step 308) and performs the call disestablishment procedure (in step 309), and the procedure is terminated. Subsequently, the controller 1 edits the receipt result information report (in step 310), and executes the procedure shown in FIG. 7 based on the calling party number and the calling party subaddress memorized in the step 305.

On the other hand, if the D-channel is selected in the step 302, since the receipt result information is transmitted to the FAX, the controller 1 executes the call establishment procedure (in step 312), and receives the USER_INFO (in step 313). Lastly, the controller 1 executes the disestablishment procedure (in step 314), and the procedure is terminated. In this case, the FAX may produce the receipt result information report based on the USER_INFO to transmit the transmitter of the USER_INFO.

Incidentally, the receipt result information report may be produced and transmitted in the packet mode. Moreover, the present invention is applicable to another terminal in addition to the FAX used for the ISDN. Furthermore, the receipt result information report may be produced and transmitted every predetermined time or every time data is transmitted.

Further, the present invention is not limited to these preferred embodiments, but various variations and modifications may be made without departing from the scope of the present invention.

What is claimed is:

1. An ISDN (integrated service digital network) terminal connected to a B-channel (data channel) and a D-channel (signal channel) comprising:

first control means for controlling the connection between said ISDN terminal and another ISDN terminal by means of predetermined protocol information transmitted through the D-channel, the predetermined protocol information including identification information of said ISDN terminal and the other ISDN terminal;

second control means for controlling the transmitting of data via the B-channel;

memory means for storing at least the identification information of the other ISDN terminal;

third control means, coupled to said memory means, for producing a receipt result information report after said ISDN terminal receives the data via the B-channel, comprising image information, the receipt result information report indicating a result of the receiving of the image information, and for controlling said first control means so that said first control means transmits said receipt result information report to the other ISDN terminal only via the D-channel; and said B-channel is a data channel prepared fundamentally for transferring image information which a user wishes to transfer using said ISDN terminal; and said D-channel is a signal channel prepared fundamentally for transferring protocol information which a user does not always wish to transfer using said ISDN terminal but which rather said ISDN terminal itself automatically transfers for controlling appropriate connection between said ISDN terminal and another ISDN terminal so as to achieve transfer of image information which a user wishes to transfer therebetween via said B-channel; and said D-channel is also used to transfer said receipt result information report even through such a receipt result information report is not a protocol information and thus transfer of such a receipt result information report is not the fundamental service of said B-channel.

2. The ISDN terminal according to claim 1, wherein said identification information further comprises a calling party subaddress and a called party subaddress which are defined by the TTC.

3. The ISDN terminal according to claim 2, wherein said receipt result information report comprises:

the calling party number;

the calling party subaddress;

the called party subaddress; and information on whether or not there is an error in said data via the B-channel.

4. The ISDN terminal according to claim 3, wherein:

said ISDN terminal further comprises a clock; and said receipt result information report further comprises time information, said time information indicating a time, obtained from said clock, at which time said ISDN terminal receives the relevant image information.

5. The ISDN terminal according to claim 3, wherein said ISDN terminal further comprises a plotter means for plotting an image corresponding to the image information on paper, and the receipt result information report further comprises paper size the paper.

6. The ISDN terminal according to claim 5, wherein said receipt result information report further comprises number information on how many papers are used for plotting said image corresponding to the image information.

7. The ISDN terminal according to claim 5, wherein said receipt result information report further comprises line density information indicating a line density value with which said image corresponding to the image information is plotted on the paper.

8. The ISDN terminal according to claim 3, wherein said receipt result information report further comprises information concerning a feature of said image corresponding to the image information plotted out on the paper.

9. The ISDN terminal according to claim 1, wherein said ISDN terminal comprises user-user information defined by the TTC (Telecommunication Technology Committee).

10. An ISDN (integrated service digital network) terminal communication system comprising:
a transmission line comprising a B-channel (data channel) and D-channel (signal channel);
at least two ISDN terminals, operatively interconnected to said transmission line, each ISDN terminal comprising;
first control means for controlling the connection between said ISDN terminal and another ISDN terminal by means of predetermined protocol information transmitted through the D-channel, the predetermined protocol information including identification information of said ISDN terminal and the other ISDN terminal;
second control means for controlling the transmitting of data via the B-channel;
memory means for storing at least the identification information of the other ISDN terminal;
third control means, coupled to the memory means, for producing a receipt result information report after the ISDN terminal receives the data via the B-channel, comprising image information, the receipt result information report indicating a result of the receiving of the image information, and for controlling the first control means so that the first control means transmits said receipt result information report to the other ISDN terminal only via the D-channel, and thus each ISDN terminal being able to recognize the receipt result information report transmitted through the D-channel; and
said B-channel is a data channel prepared fundamentally for transferring image information which a user wishes to transfer using said ISDN terminal; and
said D-channel is a signal channel prepared fundamentally for transferring protocol information which a user does not always wish to transfer using said ISDN terminal but which rather said ISDN terminal itself automatically transfers for controlling appropriate connection between said ISDN terminal and another ISDN terminal so as to achieve transfer of image information which a user wishes to transfer therebetween via said B-channel; and said D-channel is also used to transfer said receipt result information report even though such a receipt result information report is not a protocol information and thus transfer of such a receipt result information is not the fundamental service of said B-channel.

11. A method for controlling ISDN (integrated service digital network) terminals, each ISDN terminal being connected to a B-channel (data channel) and a D-channel (signal channel), each ISDN terminal comprising first control means for controlling the connection between the ISDN terminal and another ISDN terminal by means of predetermined protocol information transmitted through the D-channel the predetermined protocol information including identification information of the ISDN terminal and the other ISDN terminal, second control means for controlling the transmitting of data via the B-channel, memory means, and third control means, coupled to the memory means, for producing a receipt result information report indicating a result of receiving of the data, said data via the B-channel comprising image information, and for controlling the first control means, said method comprising the steps of:
instructing the memory means to store at least the identification information in the memory means when the protocol information is transmitted to a first ISDN terminal to which data is transmitted from a second ISDN terminal;
instructing the third control means of the first ISDN terminal to produce the receipt result information report after the image information is transmitted to the first ISDN terminal via the B-channel;
instructing the third control means to control the first control means so that the receipt result information report is transmitted form the first ISDN terminal to the second ISDN terminal only via the D-channel; and
said B-channel is a data channel prepared fundamentally for transferring image information which a user wishes to transfer using said ISDN terminal; and
said D-channel is a signal channel prepared fundamentally for transferring protocol information which a user does not always wish to transfer using said ISDN terminal but which rather said ISDN terminal itself automatically transfers for controlling appropriate connection between said ISDN terminal and another ISDN terminal so as to achieve transfer of image information which a user wishes to transfer therebetween via said B-channel; and said D-channel is also used to transfer said receipt result information report each though such a receipt result information report is not a protocol information and thus transfer of such a receipt result information report is not the fundamental service of said B-channel.

12. An ISDN (integrated service digital network) terminal connected to a B-channel (data channel) and a D-channel (signal channel) comprising:
first control means for controlling the connection between said ISDN terminal and another ISDN terminal by means of predetermined protocol information transmitted through the D-channel, the predetermined protocol information including identification information of said ISDN terminal and the other ISDN terminal;
second control means comprised of a signal controller such that said ISDN terminal can use only one B-channel when said ISDN terminal transmits or receives data via said B-channel;

memory means for storing at least the identification information of the other ISDN terminal;

third control means, coupled to said memory means, for producing a receipt result information report after said ISDN terminal receives the data via the B-channel, comprising image information, the receipt result information report indicating a result of the receiving of the image information, and for controlling said first control means so that said first control means transmits said receipt result information report to the other ISDN terminal only via the D-channel; and said B-channel is a data channel prepared fundamentally for transferring image information which a user wishes to transfer using said ISDN terminal; and said D-channel is a signal channel prepared fundamentally for transferring protocol information which a user does not always wish to transfer using said ISDN terminal but which rather said ISDN terminal itself automatically transfers for controlling appropriate connection between said ISDN terminal and another ISDN terminal so as to achieve transfer of image information which a user wishes to transfer therebetween via said B-channel; and said D-channel is also used to transfer said receipt result information report even though such a receipt result information report is not a protocol information a and thus transfer of such a receipt result information report is not the fundamental service of said B-channel.

13. An ISDN (integrated service digital network) terminal connected to a B-channel (data channel) and a D-channel (signal channel) comprising:

first control means for controlling the connection between said ISDN terminal and another ISDN terminal by means of predetermined protocol information transmitted through the D-channel, the predetermined protocol information including identification information comprised of a calling party number and a called party number which are defined by the TTC (Telecommunication Technology Committee) of said ISDN terminal and the other ISDN terminal;

second control means for controlling the transmitting of data via the B-channel;

memory means for storing at least the identification information of the other ISDN terminal;

third control means, coupled to said memory means, for producing a receipt result information report after said ISDN terminal receives the data via the B-channel, comprising image information, the receipt result information report indicating a result of the receiving of the image information, and for controlling said first control means so that said first control means transmits said receipt result information report to the other ISDN terminal only via the D-channel; and said B-channel is a data channel prepared fundamentally for transferring image information which a user wishes to transfer using said ISDN terminal; and said D-channel is a signal channel prepared fundamentally for transferring protocol information which a user does not always wish to transfer using said ISDN terminal but which rather said ISDN terminal itself automatically transfers for controlling appropriate connection between said ISDN terminal and another ISDN terminal so as to achieve transfer of image information which a user wishes to transfer therebetween via said B-channel; and said D-channel is also used to transfer said receipt result information report even though such a receipt result information report is not a protocol information a and thus transfer of such a receipt result information report is not the fundamental service of said B-channel.

14. An ISDN (integrated service digital network) terminal having at least a facsimile terminal connected thereto and which is connected to a B-channel (data channel) and a D-channel (signal channel) comprising:

first control means for controlling the connection between said ISDN terminal and another ISDN terminal by means of predetermined protocol information transmitted through the D-channel, the predetermined protocol information including identification information of said ISDN terminal and the other ISDN terminal;

second control means for controlling the transmitting of data via the B-channel;

memory means for storing at least the identification information of the other ISDN terminal;

third control means, coupled to said memory means, for producing a receipt result information report after said ISDN terminal receives the data via the B-channel, comprising image information, the receipt result information report indicating a result of the receiving of the image information, and for controlling said first control means so that said first control means transmits said receipt result information report to the other ISDN terminal only via the D-channel; and said B-channel is a data channel prepared fundamentally for transferring image information which a user wishes to transfer using said ISDN terminal; and said D-channel is a signal channel prepared fundamentally for transferring protocol information which a user does not always wish to transfer using said ISDN terminal but which rather said ISDN terminal itself automatically transfers for controlling appropriate connection between said ISDN terminal and another ISDN terminal so as to achieve transfer of image information which a user wishes to transfer therebetween via said B-channel; and said D-channel is also used to transfer said receipt result information report even though such a receipt result information report is not a protocol information a and this transfer of such a receipt result information report is not the fundamental service of said B-channel.

15. An ISDN (integrated service digital network) terminal communication system comprising:

a transmission line comprising a B-channel (data channel) and D-channel (signal channel);

at least two ISDN terminals, operatively interconnected to said transmission line, each ISDN terminal comprising;

first control means for controlling the connection between said ISDN terminal and another ISDN terminal by means of predetermined protocol information transmitted through the D-channel, the predetermined protocol information including identification information of said ISDN terminal and the other ISDN terminal;

second control means comprising a single controller for controlling the transmitting of data such that each ISDN terminal can use only one B-channel when the ISDN terminal transmits or receives data;

memory means for storing at least the identification information of the other ISDN terminal;

third control means, coupled to the memory means, for producing a receipt result information report after the ISDN terminal receives the data via the B-channel, comprising image information, the receipt result information report indicating a result of the receiving of the image information, and for controlling the first control means so that the first control means transmits said receipt result information report to the other ISDN terminal only via the D-channel, and thus each ISDN terminal being able to recognize the receipt result information report transmitted through the D-channel; and said B-channel is a data channel prepared fundamentally for transferring image information which a user wishes to transfer using said ISDN terminal; and said D-channel is a signal channel prepared fundamentally for transferring protocol information which a user does not always wish to transfer using said ISDN terminal but which rather said ISDN terminal itself automatically transfers for controlling appropriate connection between said ISDN terminal and another ISDN terminal so as to achieve transfer of image information which a user wishes to transfer therebetween via said B-channel; and said D-channel is also used to transfer said receipt result information report even though such a receipt result information report is not a protocol information and thus transfer of such a receipt result information report is not the fundamental service of said B-channel.

* * * * *